375/119

United States Patent [19]
Murayama et al.

[11] 4,415,933
[45] Nov. 15, 1983

[54] CARRIER WAVE RECOVERY CIRCUIT

[75] Inventors: Tomio Murayama; Fumio Miyao, both of Kanagawa; Shigefumi Takeuchi; Kazumi Tsukioka, both of Nagano, all of Japan

[73] Assignee: Fuji Xerox Co., Ltd., Tokyo, Japan

[21] Appl. No.: 216,704

[22] Filed: Dec. 15, 1980

[30] Foreign Application Priority Data

Dec. 18, 1979 [JP] Japan .................. 54-163594
Dec. 18, 1979 [JP] Japan .................. 54-163595

[51] Int. Cl.³ .................. H03K 5/13; H03L 7/00; H04N 1/36
[52] U.S. Cl. .................. 358/281; 375/118; 375/119
[58] Field of Search .................. 358/281; 375/97, 110, 375/118, 119; 371/47; 328/72, 73, 74, 75, 155

[56] References Cited

U.S. PATENT DOCUMENTS

3,938,086  2/1976  Valbonesi .................. 315/118
4,131,856  12/1978  Chapman .................. 375/118
4,280,099  7/1981  Rattlingourd .................. 375/119

Primary Examiner—Joseph A. Orsino, Jr.
Attorney, Agent, or Firm—Sughrue, Mion, Zinn, Macpeak & Seas

[57] ABSTRACT

A carrier signal recovery circuit to be used in a receiving side of an image information transmitting apparatus, such as in a facsimile system, including an N-bit counter for counting reference clock pulses for a period corresponding to $2^L$ (L being an integer) cycle periods of the received carrier signal. A first latch holds the most significant bits from the count of the N-bit counter while a second latch holds the least significant bits from the count of the N-bit counter. A frequency divider has a frequency dividing ratio corresponding to one cycle period of the carrier signal with the value of the frequency dividing ratio being initially set by the output of the first latch circuit. An auxiliary counter receiving an input from the second latch provides an output to the frequency divider for correcting the frequency dividing ratio such that the recovered carrier signal is outputted from the frequency divider.

11 Claims, 18 Drawing Figures

CARRIER WAVE RECOVERY CIRCUIT

BACKGROUND OF THE INVENTION

The present invention relates in general to a carrier wave recovery circuit and, more particularly, to a circuit wherein a carrier wave is reproduced by means of a digital synthesizer for use in the receiving portion of an image information transmitting apparatus such as a facsimile system.

With the increased emphasis on an automated office and the increased use and popularity of electronic apparatus in the office environment, a reliable and high-quality information transmitting apparatus, such as a facsimile system, is of greater importance. In a prior art information transmitting apparatus, vestigial sideband (VSB) transmission was utilized wherein a part of the carrier frequencies is suppressed and a signal synchronized in frequency and phase with the carrier wave is recovered and reproduced in a demodulator utilizing a phase-locked-loop (PLL) technique.

Figure 1:
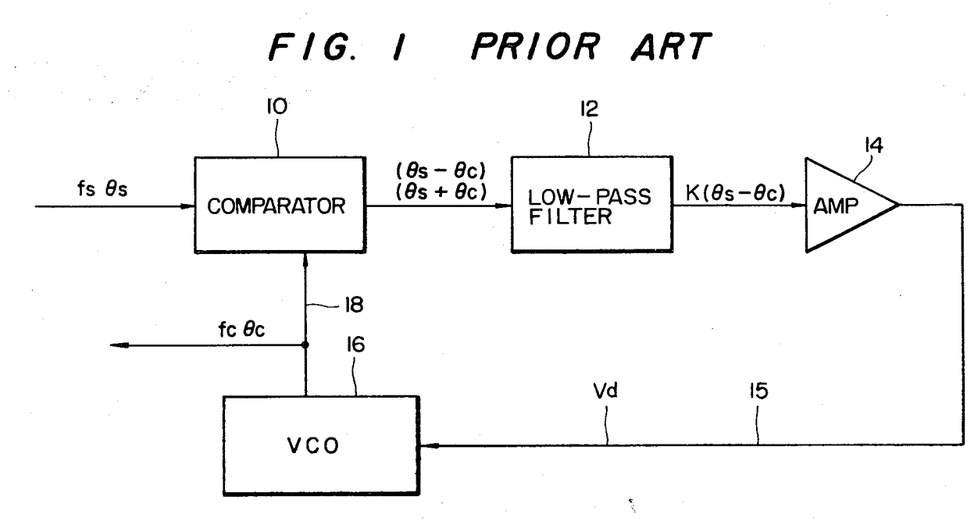
FIG. 1 is a simplified functional block diagram of a prior art phase-locked-loop circuit utilized in a conventional carrier wave recovery circuit.

A typical example of a prior art PLL circuit of this type is shown in FIG. 1. A phase comparator 2 operates as a multiplier for two AC input signals $f_s$ and $f_c$. The output of the phase comparator 2 is applied through a low-pass filter 2 to an amplifier 3 which outputs a voltage Vd proportional to the time variation of a phase difference $(\theta_s - \theta_c)$ detected. A voltage-controlled oscillator 4 (hereinafter referred to as "a VCO" when applicable), which is controlled by the input voltage Vd, operates to cause the signal $f_c$ to approach the signal $f_s$. The system is stabilized when $f_s = f_c$.

In prior art information transmitting apparatus utilizing such an analog PLL technique, various problems are encountered including the use of a circuit that is susceptible to noise, a circuit that requires a great number of adjustments, and a circuit whose circuit having parameters susceptible to variations and changes after a long period of usage.

In order to eliminate these difficulties, a PLL circuit using a digital phase comparator has been proposed in the art. However, that circuit also suffers from the problem that, as the output frequency is changed according to the input voltage applied to the VCO, the output frequency is varied by supply voltage variations and by external noise.

Accordingly, objects of the invention are to provide a carrier reproduction system in which the VCO is eliminated, carrier reproduction is performed completely in a digital mode thereby to eliminate all of the above-described drawbacks accompanying a conventional carrier reproduction system, and to provide a carrier reproduction system which has excellent stability and reliability, is capable of high productivity during manufacture and is suitable for use in a video data transmission system such as a facsimile system.

SUMMARY OF THE INVENTION

The invention as claimed satisfies the objects set forth above by providing a carrier wave recovery circuit in which the voltage controlled oscillator (VCO) of the conventional circuit is replaced for the purpose of digitizing the entire circuit thus providing a number of advantageous features. The advantageous features include high stability and reliability, ease of manufacture and adaptability for use in image information transmitting apparatus such as facsimile systems. Since the entire inventive circuit is of a digital nature, and since a discriminating function is assigned to a counter that determines the frequency dividing ratio, erroneous operation of the circuit is avoided regardless of the presence of instantaneous interruptions in the image information transmission line. The digital construction of the invention further affords advantageous features such as reducing the number of necessary adjustments, enhancing the resistance to noise and power source variations and reducing the variations in the values of various circuit components after a long period of usage. Furthermore, since the inventive circuit is free from frequency drift, the circuit can be used for carrier waves of different frequencies and thereby provides economical circuit use.

BRIEF DESCRIPTION OF THE DRAWINGS

The invention will be described in detail below with reference to the drawings in which.

DESCRIPTION OF THE PREFERRED EMBODIMENTS

Figure 2:
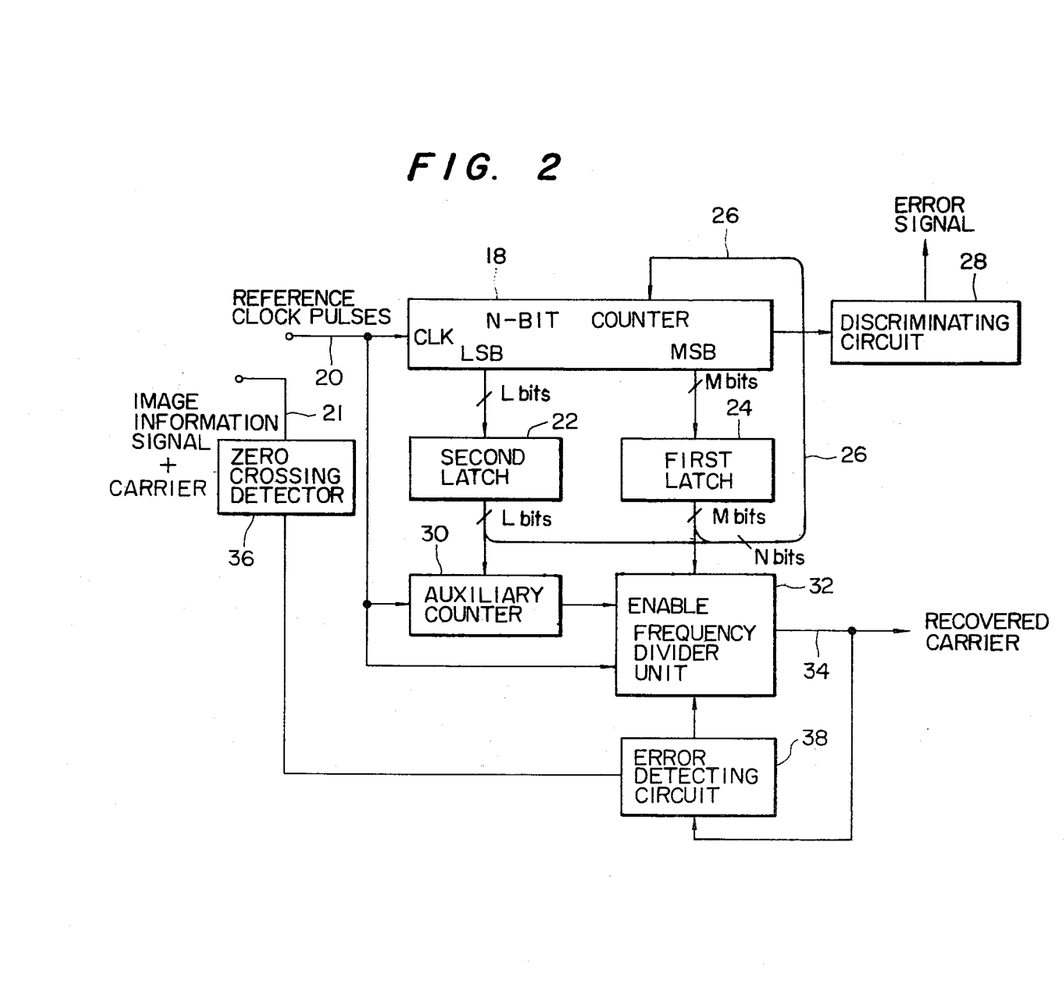
FIG. 2 is a simplified functional block diagram showing an embodiment of a carrier signal recovery circuit according to the present invention.

With reference to FIG. 2, there is illustrated a first preferred embodiment of the present invention wherein a synthesizer is used instead of a phase-locked loop. In the operation of an image information transmitting apparatus such as a facsimile system, there is a protocol period of synchronizing to the actual transmission of image information during which signals related only to the carrier component are transmitted. According to the present invention, reference clock pulses (CLK) arriving in one cycle period of the carrier signal are firstly counted during the synchronizing period for initial setting of the circuit after which fine correction of the set value is then carried out utilizing a received line synchronizing signal or a signal component obtained after the initiation of the image information transmission.

During the synchronizing period of the protocol time, an N-bit counter 18 in FIG. 2 counts reference clock pulses CLK arriving on line 20 from a local facsimile receiver in a period corresponding to $2^L$ (L being an integer) cycle periods of the carrier wave (first counting) with the count of the N-bit counter 18 held in latches 22 and 24. The complement of the number count held in the latches 22 and 24 is then preset in the N-bit counter 18 with the number count being transferred on lines 26. Then, the clock pulses CLK on line 20 are again counted, as described above, by the N-bit counter 18. When the count result is equal to the count of the first counting operation, a zero output signal is delivered from the counter 18 to a discriminating circuit 28. The discriminating circuit 28 determines at a predetermined time whether a zero signal is present or not at its input, and when a zero signal is not found, the discriminating circuit 28 delivers an instruction to circuitry in the local receiver (not shown) to resume the counting operation once again.

On the other hand, when a zero signal is present at the input to the discriminating circuit 28, M bits which are the count output of the N-bit counter 18 except for a lower L bits, are stored in the latch 24. Assuming that $T_1$ represents one cycle period of the received carrier signal, $T_2$ represents one cycle period of the clock pulses on line 20, and L and M satisfy the following relations:

$$L + M = N \text{ (L = least significant bits)}$$

$$T_2 + 2^M > T_1, \text{ (M = most significant bits)}$$

during one cycle period $T_1$, the quantizing error corresponds to less than $$\binom{+1}{-0}$$

of one cycle period of the clock pulse CLK. Thus, if the frequency of the clock pulses CLK is divided by M, a recovered and reproduced carrier signal can be obtained with a quantized error corresponding to less than one cycle period of the clock pulse CLK.

However, such an approximation tends to result in an excessive amount of error due to the accumulation of the quantizing errors. For overcoming this difficulty, an auxiliary counter 30 is further provided in the circuit shown in FIG. 2 to prohibit the counting operation by the frequency divider unit 32 a number of times corresponding to the L bits stored in the latch 22, for every $2^L$ cycle periods of the received carrier signal, each time for one cycle period of the clock pulse CLK. As a result, the error in the reproduced carrier signal on line 34 can be corrected or reduced to less than one cycle period of the clock pulse CLK for every $2^L$ cycle periods of the received carrier signal.

The above-described operation will now be described in more detail. Although the N-bit counter 18 in the first-described embodiment is of a binary type, the operational principle is the same for a binary counter and a decimal counter. For the purpose of simplifying the description, the operation is described for the case of a decimal counter.

Figure 3A:
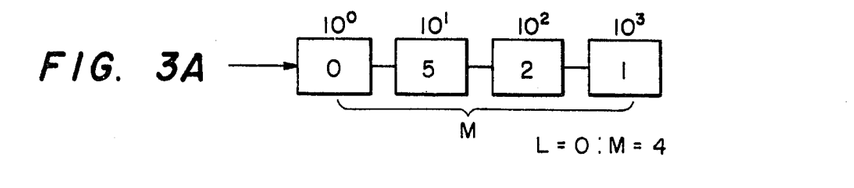
FIGS. 3A and 3B are simplified explanatory diagrams of the operation of an N-bit counter in the circuit shown in FIG. 2.
Figure 3B:
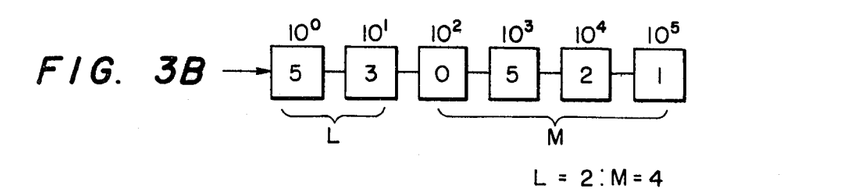

It is assumed that a number equal to 1250.35 of the reference clock pulses CLK are mounted for each cycle period of the received carrier signal. In the case of L=0 and M=4 as illustrated in FIG. 3A, the N-bit counter 18 counts to "1250" while the N-bit counter 18 counts "125035" in the case shown in FIG. 3B where L=2 and M=4. In the latter case, the first latch 24 in the circuit shown in FIG. 2 holds "1250" while the second latch 22 holds "35." That is, the first latch 24 holds a value "1250" obtained by discarding the lower two bits from the count of the N-bit counter 18, which value is accompanied by a quantization error of "0.35" less than one cycle period of the reference clock pulse CLK for every one cycle period of the received carrier signal.

Accordingly, if the frequency dividing ratio of the frequency divider 32 is set at the value "1250" held in the latch 24, a quantization error corresponding to less than one cycle period of the clock pulse CLK will be added for every three cycle periods of the carrier signal. Thus, by simply delivering an inhibit signal from the auxiliary counter 30 in every third cycle period of the carrier signal to the frequency divider unit 32, the quantization error can be reduced to less than one cycle period of the clock pulse for every 60 cycle periods of the carrier signal. In other words, by inhibiting the operation of the frequency divider unit 32 for 35 times for each 100 cycle periods of the carrier signal, the quantization error can be reduced to a value corresponding to less than one cycle period of the clock pulse for every 100 cycle periods of the carrier signal.

For the purpose of enabling the frequency of the recovered and reproduced carrier signal on line 34 to follow the slow variations of the frequency of the carrier signal from the transmitting side during the transmitting time, zero crossing points of the received carrier signal included in the image information signal obtained from the transmission line are detected by a zero crossing detector 36 or the like. The deviations between those zero crossing points and those of the reproduced carrier signal are compared and discriminated by an error detecting circuit 38 for correcting the operation of the frequency divider unit 32 to correct the phase of the recovered carrier.

Examples of the N-bit counter 18, latches 22 and 24 and the discriminating circuit 28 and their operations will now be described in detail.

Figure 4:
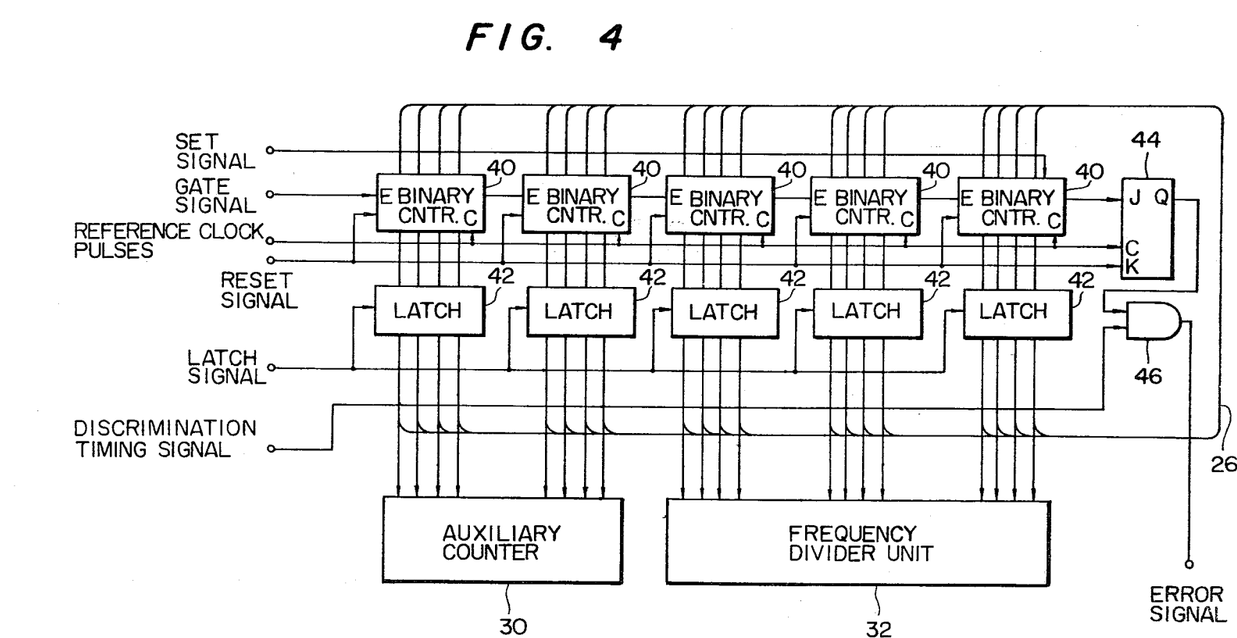
FIG. 4 is a schematic diagram showing a practical embodiment of one portion of the circuit shown in FIG. 2.

In FIG. 4, the N-bit counter 18 is composed of five 4-bit binary counters 40, the latches 22 and 24 are composed of five 4-bit latches 42, and the discriminating circuit 28 is composed of a JK flip-flop 44 and an AND gate 46. In each of the binary counters 40, E designates an enabling terminal and C designates a carry output terminal.

At first, a reset signal is applied to the counters 40 and the JK flip-flop 44 to reset these circuits. Then, a gate signal is applied to the counters 40 for enabling the counters to count a reference clock CLK for a period corresponding to 256 cycle periods of the received carrier signal.

When the gate signal is turned off, a latch signal is applied from outside to latch the latch circuits 42 so as to hold the counts of the counters 40 in the latches 42. The outputs of the latches 42 are the outputs of the counters 40 at the latched time. The complement of the outputs of the latches is set by an external set signal into the counters 40. When the setting operation has been completed, a gate signal is again applied to the counters 12 for operating the counters 40 to count the clock pulses CLK for a time corresponding to 256 cycle periods of the received carrier signal. In the case when the first count is equal to the second count of the counter, each of the counters 40 is reset to zero and a carry signal is delivered from the end terminal of the last stage counter 40 to the J terminal of the JK flip-flop 44.

After the termination of the second counting operation, a discrimination timing signal is applied to the gate 46 to open the gate for delivering an output from the Q terminal of the JK flip-flop 44 outwardly. While the output from the terminal Q indicates that the result of the discrimination has been found to be allowable, a value corresponding to the required frequency dividing ratio is set in the frequency divider unit 32 and a correcting value required for reducing the quantized error for the 256 cycle periods of the carrier signal to a value corresponding to less than one cycle period of the clock pulse is set in the auxiliary counter 30.

The operation of the frequency divider unit 32 and the error detecting circuit 38 of the circuit in FIG. 2 will be described in more detail with reference to FIG. 5. As described above, the zero crossing points of the received signal 14 are compared with the phase of the variation points, from "1" to "0" or from "0" to "1," of the carrier signal by the phase comparison circuit 58 which outputs either a leading signal 58a or lagging signal 58b. The decision circuit 60 of the error detecting circuit 38 determines whether or not the leading signal 58a or the lagging signal 58b is outputted by the phase comparison circuit 58 a predetermined number of times continuously according to the phase difference between the zero crossing points of the received carrier signal and the variation points of the reproduced carrier signal on line 34. The reason why the decision circuit is provided will be described below. When it is decided that the phase comparison circuit has provided the output the predetermined number of times continuously, the electronic switch 48 or 52 is controlled by the one of the signals 58a or 58b which is applied through the decision circuit 60.

In the ordinary case, the reference clock on line 20 is frequency-divided by the frequency divider 50 or 54 with a frequency division ratio set by the M bits held in the latch circuit 8 or the L bits latched in the latch circuit 7 to provide the reproduced carrier signal on line 34. However, if the phase of the reproduced carrier signal begins to lag the phase of the received signal and the phase comparison circuit 58 provides the lagging signal 58b the predetermined number of times continuously, then the electronic switch 19 is switched to cause the frequency divider 50 to apply to the frequency divider 54 a frequency divider output $S_3$ whose frequency division ratio is smaller than that in the above-described case for $S_4$ so that the phase of the reproduced carrier signal is advanced. If, on the other hand, the phase of the reproduced carrier signal begins to lead the phase of the received signal, then the phase comparison circuit 16 provides the leading signal 58a. After the leading signal 58a has been provided the predetermined number of times, the electronic switch 18 is opened. As a result, the signal $S_2$ which is applied to the frequency divider 50 is set to "0" so that the counting operation of the frequency divider 50 is inhibited for the period that the leading signal 58a is provided. Thus, the phase of the reproduced carrier signal is delayed.

The phase of the reproduction carrier 13 is corrected as described above.

Figure 6A:
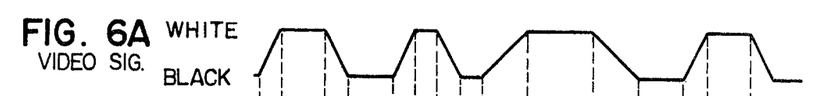
FIGS. 6A–6H are a series of waveforms for an AM-PM-VSB signal processed in accordance with the invention.
Figure 6B:
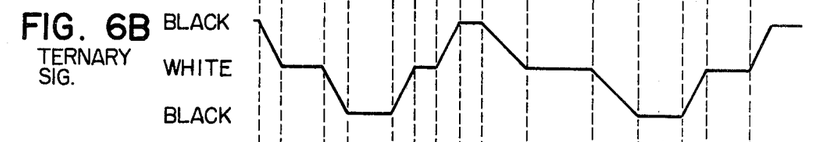
Figure 6C:
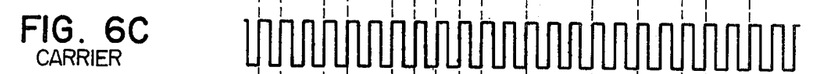
Figure 6D:
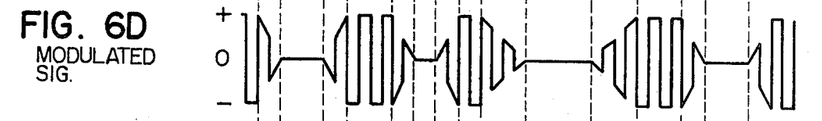
Figure 6E:
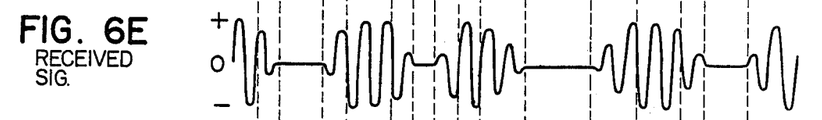

FIGS. 6A-6H show waveforms in an AM-PM-VSB signal for which carrier reproduction in accordance with the invention is carried out. On the signal transmitter side, every other time a black signal appears in a white-black binary video signal as shown in FIG. 6A, it is inverted to provide a black-white-black ternary signal. The ternary signal is modulated with a carrier as shown in FIG. 6C to form a modulated signal as shown in FIG. 6D which is the transmitted signal. The signal receiver side receives a signal as shown in FIG. 6E.

Figure 6F:
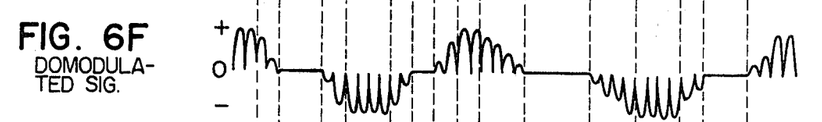
Figure 6G:
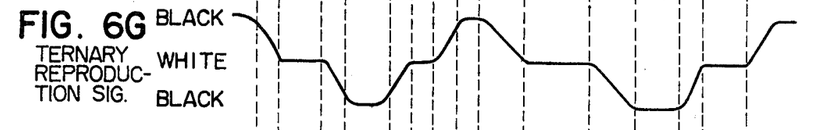
Figure 6H:
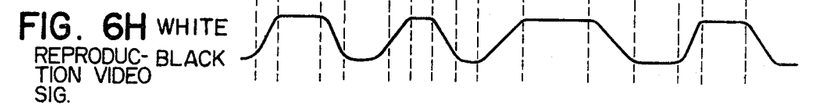

On the signal receiver side, the carrier reproduction operation is carried out. Here, the received signal is folded for every half period of the carrier to obtain a demodulated signal as shown in FIG. 6F. In a procedure opposite to that used for signal transmission, the demodulated signal is processed to obtain a ternary reproduced signal as seen in FIG. 6G and a reproduced video signal as in FIG. 6H. Accordingly, in the case when the carrier reproduction operation is carried out correctly, the phase of the reproduced carrier is at zero or $\pi$ at the time instant that the polarity of the received signal (FIG. 6E) is inverted.

Therefore, if the phase comparison circuit is enabled when the reproduction carrier phase is nearly zero or $\pi$, then the phase of the reproduction carrier is compared with the phase of the zero crossing points of the received signal detected by the zero crossing detector 15 to thereby determine whether the reproduced carrier phase is leading or lagging.

Figures 7A, 7B:
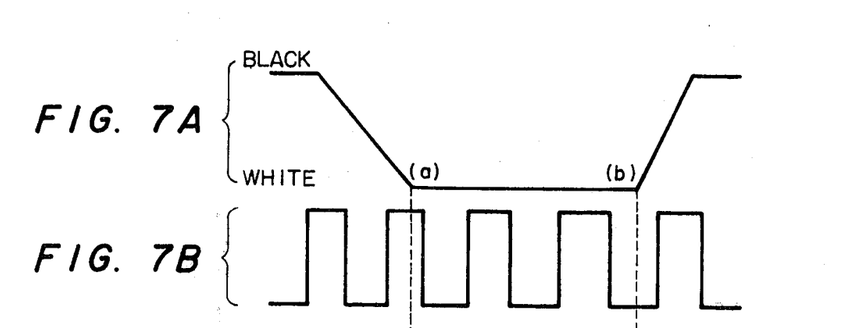
FIGS. 7A–7C are enlarged views showing a part of waveforms of FIGS. 6A, 6C and 6D.
Figure 7C:
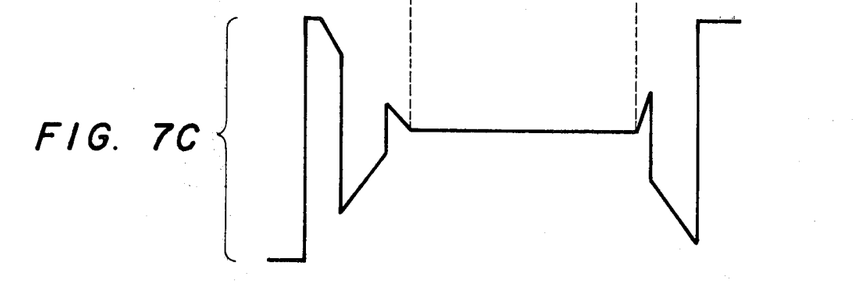

As shown in FIGS. 7A-7C, which are enlarged views of the video signal, carrier and modulated signal in FIGS. 6A, 6C and 6D, respectively, the modulated signal is not always formed so that, at the edge of a black signal, the zero crossing point of the received signal coincides with the zero of $\pi$ angle of the carrier phase. In order to prevent decision errors due to such a black signal edge part, the decision circuit 60 in FIG. 5 provides its output decision signal only when the phase comparison circuit 16 has provided the signal the predetermined number of times (for instance, eight times) continuously. According to the decision result of the decision circuit 60, one of the electronic switches 48 or 52 is controlled to cause the phase of the reproduced carrier signal to match that of the received signal.

Figure 8:
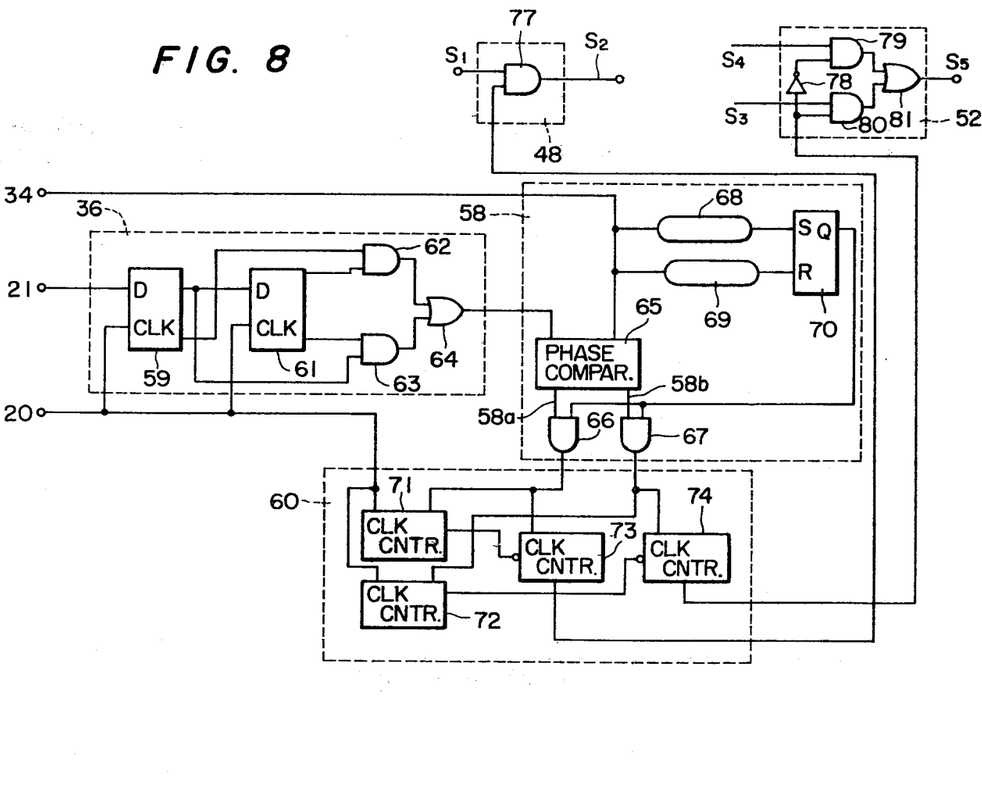
FIG. 8 is a detailed schematic diagram showing a part of the carrier reproduction circuit of FIG. 5.

FIG. 8 shows a specific example of the above-described zero crossing detector, phase comparison, decision, and switch circuits. In the zero crossing detector 36, the zero crossing point of the received signal on line 21 is detected by two D flip-flop circuits 59 and 61 and AND circuits 62 and 63, and an OR circuit 64 produces a zero crossing signal having a width corresponding to one reference clock period. The zero crossing signal thus produced is applied to a phase comparator 65. The phase comparator 65 compares the zero crossing signal outputted by the zero crossing detector 65 with the reproduced carrier on line 34. When the phase of the reproduced carrier signal leads that of the received signal on line 21, the phase comparator 65 applies the leading signal 58a to an AND circuit 66 and when it lags, the lagging signal 58b.

A delay circuit 68 provides a delay of $(T_R - \Delta t/2)$, where $T_R$ is one reproduced carrier signal period, and a delay circuit 69 provides a delay of $(T_R + \Delta t/2)$. The outputs of the delay circuits 68 and 69 are connected to the S terminal and the R terminal, respectively, of an RS flip-flop circuit 70. Accordingly, the RS flip-flop circuit 70 provides an output signal only for the interval $\Delta t$ near the variation point of the reproduced carrier signal. Therefore, only while the reproduced carrier phase is near zero or $\pi$ are the AND circuits 66 and 67 opened to introduce the leading signal 58a or the lagging signal 58b to the decision circuit 60.

When the decision circuit 60 determines that the leading signal 58a or the lagging signal 58b has been provided the predetermined number of times continuously, with the aid of one of the counters 73 and 74, the decision circuit 60 delivers a control signal to one of the electronic switches 48 and 52. Counters 71 and 72 are provided to reset the counters 73 and 74 when neither the leading signal 58a or the lagging signal 58b is provided for about a period of time of $(T_R/2 + \Delta t)$.

When the decision circuit 60 produces an output indicative of phase lagging of the reproduced carrier signal in the above-described manner, the electronic switch 52 is switched. As a result, the frequency division clock signal $S_4$ which is normally inputted is switched over to the frequency division clock $S_3$ whose period is shorter than that of the frequency division clock $S_4$ to thereby advance the phase of the reproduced carrier signal. On the other hand, when the decision circuit 60 provides the output indicative of phase leading, a frequency divider operating signal $S_2$ is temporarily blocked (i.e., set to "0") by the electronic switch 48 (AND circuit 77) thereby to delay the phase of the reproduced carrier signal.

Figure 5:
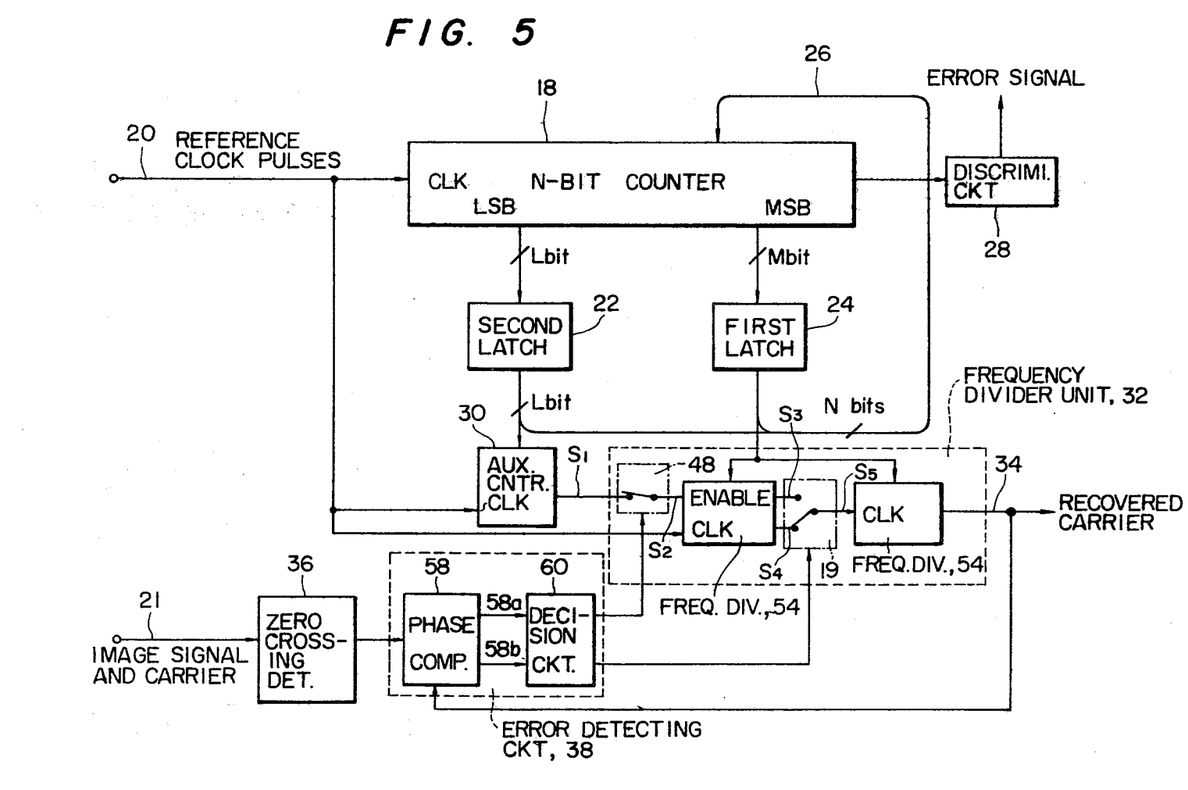
FIG. 5 is a block diagram showing further details of the carrier recovery circuit of FIG. 2.

In the circuit shown in FIG. 5, the electronic switch 48 is provided between the quantization error correcting counter and the frequency divider 50. However, the position of the electronic switch 48 is not limited thereto or thereby. That is, the same switch can be provided on the reference clock input side of the frequency divider 50 or between the electronic switch 52 and the frequency divider 54. In these cases, the advantageous effects of the invention are maintained even if the quantization error correcting counter is omitted.

The range of operation of the phase comparison circuit is limited to prevent the occurrence of errors due to noise, etc. The counters in the decision circuit 60 may be formed by utilizing a part of the N-bit counter 18 because the operational times of the N-bit counter 18 are always different from those of the phase comparison circuit 58 and the decision circuit 60.

Since all the circuits in FIG. 8 are operated by digital signals, some or all of the circuits may be provided in the form of "soft" logic and implemented with a microcomputer or may be provided in the form of LSI. This provides an economical advantage because the circuits of FIG. 8 can be provided at a lower manufacturing cost than those according to the conventional system.

As is apparent from the above description, according to the invention, carrier reproduction correction is carried out in a digital mode even during a video data transmission period. Accordingly, the digital carrier reproduction circuit according to the invention has fewer adjustments, is stabler against noise and power source variations, quicker in following the received signal variations, higher in stability and reliability and has less circuit-induced variations with time than the prior art carrier reproduction circuit using the analog system.

Although the present invention has been described with reference to preferred embodiments, it will be appreciated by those skilled in the art that various modifications, alternatives, variations, etc. may be made without departing from the spirit and scope of the invention as defined in the appended claims.

What is claimed is:

1. A carrier signal recovery circuit comprising:
   N-bit counter means for counting reference clock pulses for a period corresponding to $2^L$ cycle periods of a received carrier signal, where N and L are integers;
   a first latch circuit operatively connected to first outputs of said N-bit counter for holding an upper M most significant bits of a count produced by said N-bit counter means;
   a second latch circuit operatively connected to second outputs of said N-bit counter means for holding a lower N−M least significant bits of said count produced by said N-bit counter means;
   frequency divider means operatively connected to said first latch circuit and having a frequency dividing ratio corresponding to one cycle period of said received carrier signal, said frequency dividing ratio being initially set by outputs of said first latch circuit; and
   second counter means operatively connected between said second latch means and said frequency divider, said second counter means providing an output to said frequency divider means for correcting said frequency dividing ratio, a recovered carrier signal being outputted from said frequency divider.

2. The carrier signal recovery circuit as claimed in claim 1 wherein the outputs of said first and second latch circuits are operatively connected to said N-bit counter means to preset said N-bit counter means to a complement of the number represented by said outputs of said first and second latch circuits for providing a discriminating function for said N-bit counter means.

3. The carrier signal recovery circuit as claimed in claim 1 further comprising error detecting circuit means operatively connected to said frequency divider to adjust the phase of said recovered carrier signal.

4. The carrier signal recovery circuit as claimed in claim 3 further comprising a zero crossing detector operatively connected to said error detecting circuit, said zero crossing detector having an input signal which includes an image information signal and said received carrier signal.

5. The carrier signal recovery circuit as claimed in claim 1 further comprising a discriminating circuit operatively connected to a carry output of said N-bit counter means, said discriminating circuit providing an error signal as an output when a zero signal from said N-bit counter means is not received at a predetermined time.

6. A carrier signal recovery circuit comprising:
   N-bit counter means for counting reference clock pulses for a carrier period corresponding to $2^L$ periods, where N and L are integers;
   a latch circuit operatively coupled to first outputs of said N-bit counter means for holding (N−L) most significant bits of a count output of said N-bit counter means;
   frequency divider means coupled to be initially set by an output of said latch circuit with the number of reference clock pulses counted for one carrier period as a frequency division ratio, said frequency divider means outputting a recovered carrier signal;
   zero crossing detector means for detecting zero crossing points of a received signal; and
   a phase comparison circuit having inputs coupled to an output of said zero crossing detector and to said recovered carrier signal for detecting a phase difference between said zero crossing points and variation points of said recovered carrier signal to provide in response to said phase difference a leading signal or a lagging signal to correct the phase of said recovered carrier.

7. The carrier signal recovery circuit as claimed in claim 6 wherein said frequency divider means comprises means for correcting the phase of said recovered carrier signal in accordance with said one of said leading signal and said lagging signal only after said one of said leading signal and said lagging signal has been outputted by said phase comparison circuit a predetermined number of times continuously.

8. The carrier signal recovery circuit as claimed in claim 6 or 7 wherein said phase comparison circuit comprises means for providing said leading signal or said lagging signal only within a predetermined period of time around said variation points of said recovered carrier signal.

9. The carrier signal recovery circuit as claimed in claim 6 or 7 wherein said frequency divider means comprises first and second frequency dividers, said second frequency divider receiving an output of said first frequency divider and outputting said recovered carrier signal.

10. The carrier signal recovery circuit as claimed in claim 6 or 7 comprising means for suspending application of said reference clock pulses to said frequency divider means temporarily according to said leading signal.

11. The carrier signal recovery circuit as claimed in claim 6 or 7 wherein, when said lagging signal is outputted by said phase comparison circuit, the frequency division ratio of said first frequency divider is reduced.

* * * * *